United States Patent [19]

Ducharme et al.

[11] 4,413,219
[45] Nov. 1, 1983

[54] FORK TRUCK BATTERY CHARGING SYSTEM

[75] Inventors: Ronald L. Ducharme, Grand Rapids, Mich.; Robin Taylor, Homewood, Ill.

[73] Assignee: Interlake, Inc., Oak Brook, Ill.

[21] Appl. No.: 364,677

[22] Filed: Apr. 2, 1982

[51] Int. Cl.³ .............................................. H02J 7/00
[52] U.S. Cl. ........................................... 320/15; 320/2
[58] Field of Search .............................. 320/2, 6, 8, 15

[56] References Cited

U.S. PATENT DOCUMENTS 2,173,736  9/1939  Thomas ..................................... 320/2
3,823,367  7/1974  Kaye et al. ............................... 320/2

FOREIGN PATENT DOCUMENTS 972858  2/1951  France .................................... 320/15

Primary Examiner—William M. Shoop
Assistant Examiner—Anita M. Ault

Attorney, Agent, or Firm—Emrich & Lee and Brown, Hill, Dithmar, Stotland, Stratman & Levy

[57] ABSTRACT

A battery charging system includes a highrise storage system for holding a plurality of battery chargers and defining a plurality of battery locations. Each battery to be charged is placed on a pallet which has a connection block with a cable connectable to the battery and a male connector. A load carrier carries the pallet and the battery to a selected battery location in the rack and deposits it thereat in a charging position, thereby connecting the male connector to a female connector on the rack connected to one of the chargers. The load carrier also retrieves charged batteries on their pallets from the rack, the retrieval motion effecting disconnection of the pallet from the charger. Each pallet has a fluid receiving trough provided with a drain which cooperates with fluid inlets of a fluid collection system on the rack for collecting fluids emitted during the charging process.

36 Claims, 8 Drawing Figures

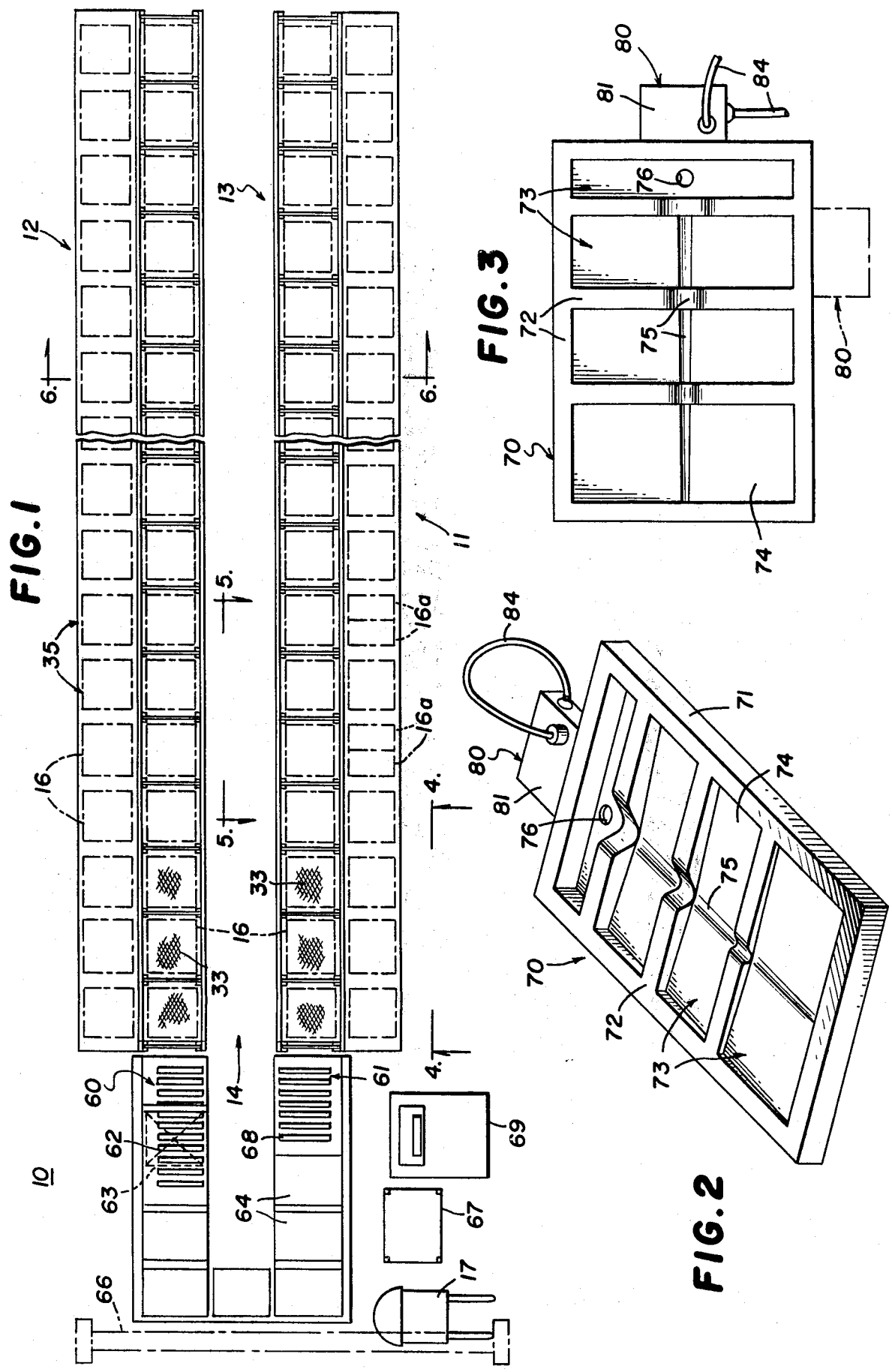

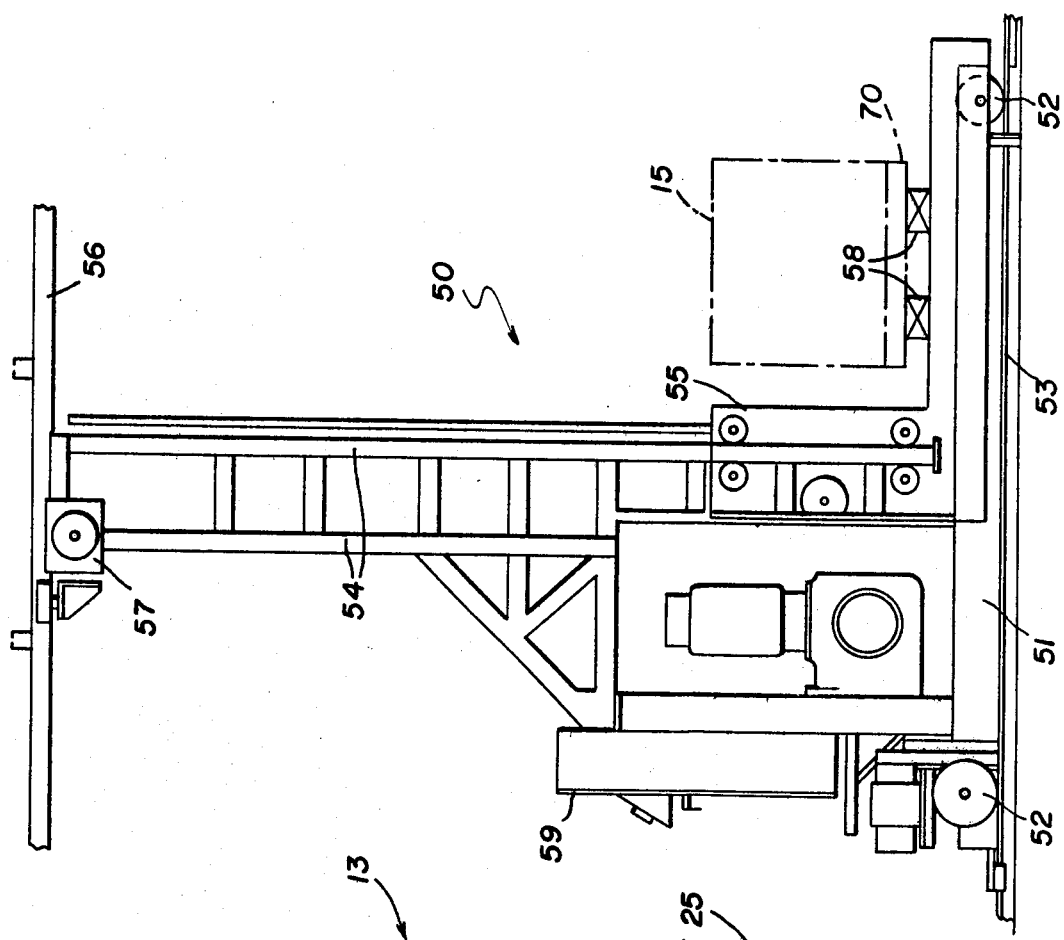
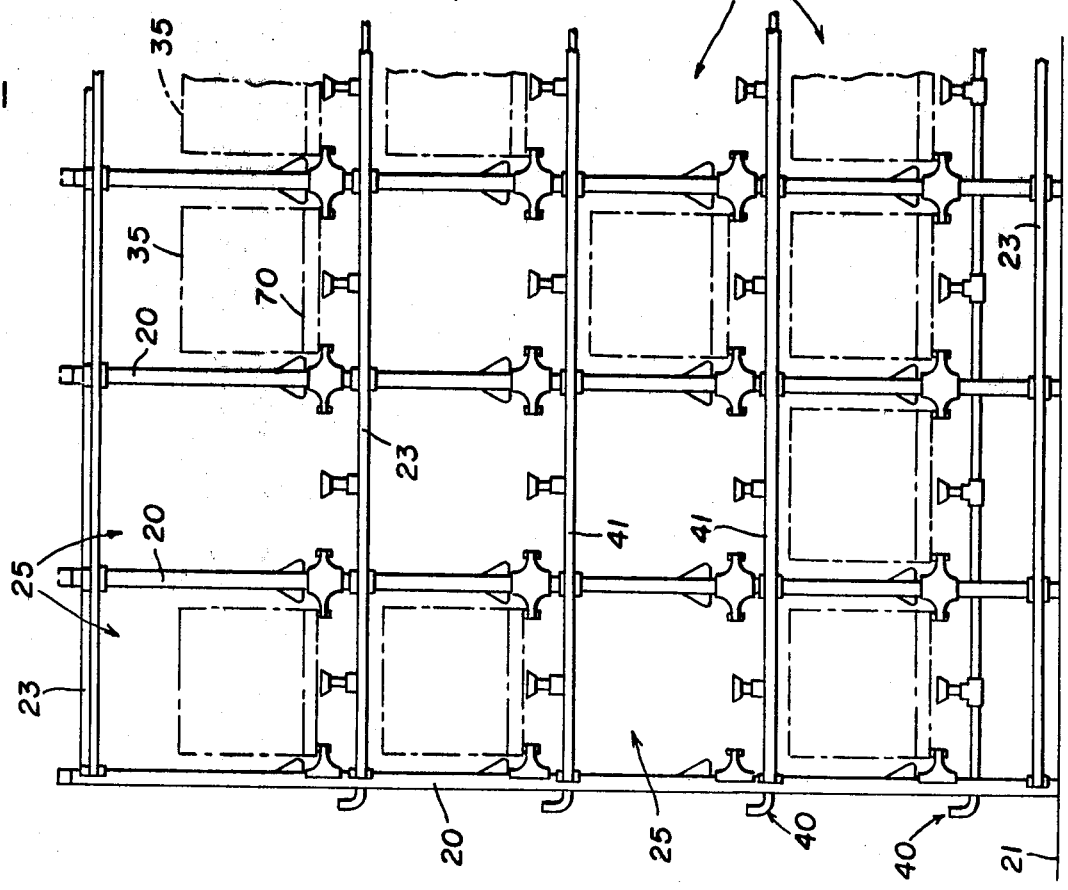

FORK TRUCK BATTERY CHARGING SYSTEM

BACKGROUND OF THE INVENTION

The present invention relates to the charging of storage batteries and the like, for example, and, in particular, to the charging of industrial storage batteries of the type which are used to provide motive power for fork lift vehicles and the like.

In large factories and warehouses it is common to utilize a number of battery-driven vehicles such as fork lift trucks, tractors and the like. These vehicles are powered by large, heavy-duty electrical storage batteries which are removably mounted in the vehicles. The batteries must be frequently recharged, sometimes daily. Thus, typically, there are a number of batteries being charged while other batteries are being used in the vehicles.

The charging operation requires a considerable amount of manual labor in removing the discharged batteries from the vehicles and connecting them to the chargers at a charging location and replacing charged batteries in the vehicles. The charging location can occupy a considerable amount of floor space and the entire operation can be quite hazardous because of exposure of the operators to corrosive fluids and explosive vapors emitted from the battery. The danger of explosion is particularly acute during the charging process because of the possibility of electrical sparks from the charging apparatus. Also, care must be taken to keep track of the length of time each battery has been charging.

SUMMARY OF THE INVENTION

It is a general object of this invention to provide a battery charging system which avoids the disadvantages of prior techniques while affording additional structural and operating advantages.

It is an important object of this invention to provide a battery charging system which obviates personnel coming into close proximity to the batteries during the charging operation.

It is another important object of this invention to provide a battery charging system which minimizes manual labor and handling of the batteries.

Yet another object of this invention is the provision of a battery charging system which minimizes the floor space required per battery during the charging operation.

A further object of this invention is the provision of a battery charging system which permits the rapid and accurate handling of a large number of different types of batteries.

A further object of this invention is the provision of a battery charging system which facilitates collection of fluids emitted from batteries during the charging process.

Another object of this invention is the provision of a system which assures first-in and first-out handling of the batteries during the charging operation.

These and other objects of the invention are attained by providing a battery charging system for supporting and interconnecting industrial storage batteries and associated chargers, said system comprising: rack means defining a plurality of battery locations and a plurality of charger locations, battery support means at each of the battery locations for supporting a battery thereat in a charging position, charger support means at each of the charger locations for supporting a charger thereat, first connector means electrically connectable to each associated battery, and a plurality of second connector means respectively disposed at the battery locations and respectively electrically connected to associated chargers at the charger locations, the first and second connector means being arranged for electrical interconnection in response to movement of a battery to its charging position at a selected one of the battery locations and for electrical disconnection in response to movement of the battery from the charging position.

The invention consists of these and other novel features and a combination of parts hereinafter fully described, illustrated in the accompanying drawings and particularly pointed out in the appended claims, it being understood that various changes in the details may be made without departing from the spirit or sacrificing any of the advantages of the invention.

BRIEF DESCRIPTION OF THE DRAWINGS

FIG. 1 is a top plan view of a battery storage system constructed in accordance with and embodying the features of the invention, with a portion of the rack and the transport vehicle removed;

FIG. 2 is a perspective view of a battery pallet for use in the battery storage system of FIG. 1;

FIG. 3 is a top plan view of the battery pallet of FIG. 2;

FIG. 4 is an enlarged, fragmentary side elevational view of the battery storage system of the present invention, taken generally along the line 4—4 in FIG. 1, but with the charger bays removed;

FIG. 5 is an enlarged, fragmentary view of the transport vehicle of the battery storage system, taken generally in the direction indicated by the line 5—5 in FIG. 1;

DESCRIPTION OF THE PREFERRED EMBODIMENT

Figure 6:
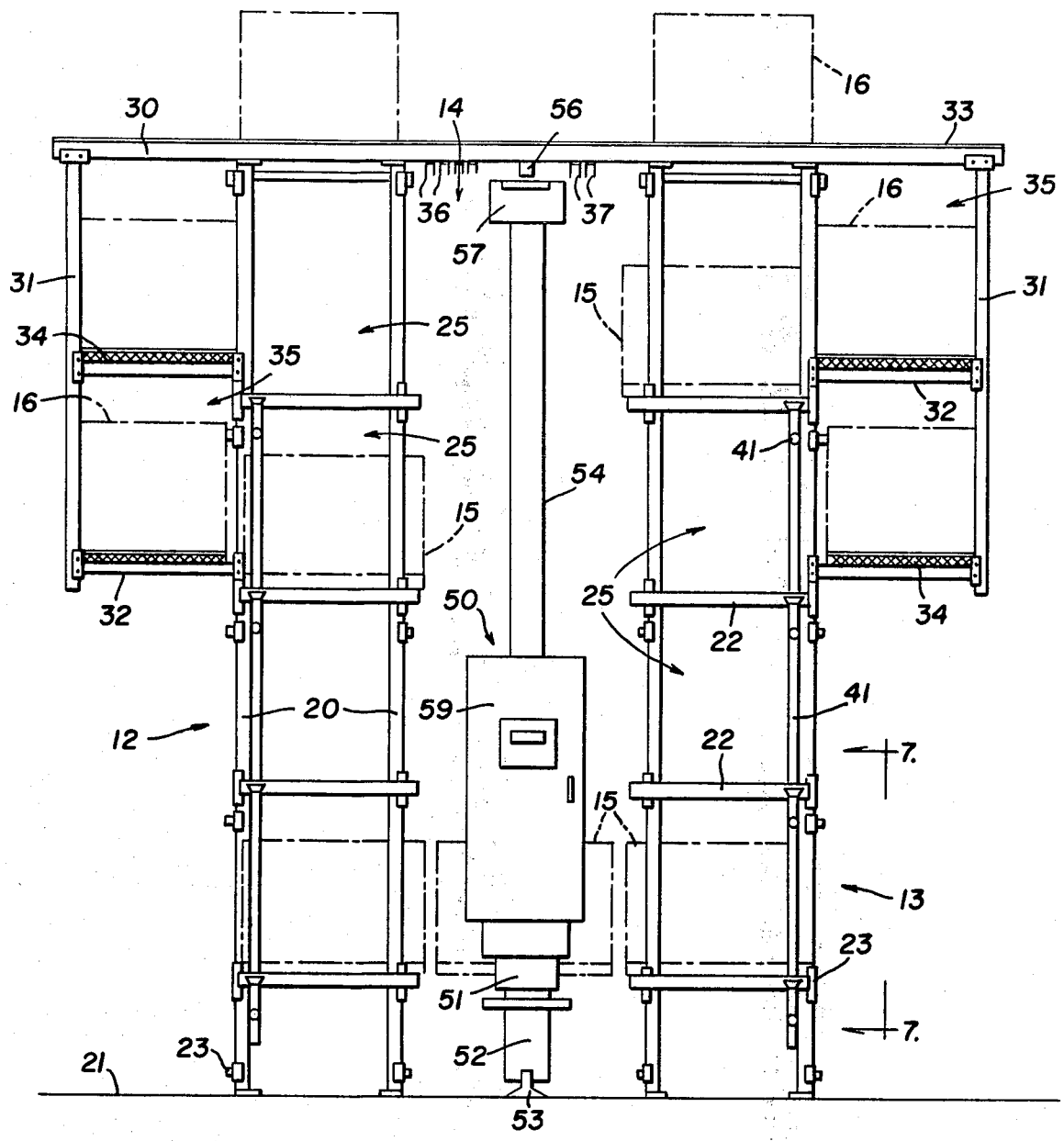
FIG. 6 is an enlarged view in vertical section taken along line 6—6 in FIG. 1.

Referring to FIGS. 1, 4 and 6 of the drawings, there is illustrated a battery charging system, generally designated by the numeral 10, which includes a rack assembly 11 comprising two elongated rack rows or sections 12 and 13 arranged substantially parallel to each other with an aisle 14 therebetween. The system 10 is designed for storage and charging of heavy-duty industrial storage batteries 15 and chargers 16 and 16a therefor, the batteries 15 being of the type which are used to provide motive power for electrically-driven fork lift trucks 17 and the like. The rack sections 12 and 13 are arranged substantially as mirror images of each other and, therefore, the following description applies to each.

Each of the rack sections 12 and 13 includes a framework of vertically-disposed support post members 20 supported on and fixedly secured to an underlying floor or support surface 21, and interconnected by laterally-extending horizontal cross members 22 and longitudinally-extending cross members 23. The members 21-23 are preferably formed of metal and may be of standard construction, being spaced apart for cooperation to define a plurality of battery locations or bays 25. More particularly, each of the rack sections 12 and 13 is preferably arranged in a highrise configuration 4-bays high, although it will be appreciated that the rack sections could be constructed to any desired height. Similarly, each of the rack sections 12 and 13 may be extended to any desired length, although in a typical form of the invention each would be 25 bays long, so that the total number of battery bays 25 provided in the system 10 is 200.

Projecting laterally inwardly from the post members 20 into each of the battery bays 25, respectively from the lateral sides thereof, are short support arms 26 (see FIGS. 7 and 8) carrying at the inner ends thereof elongated support rails 27, each extending horizontally along the adjacent side of the battery bay 25. Also supported on the post members 20 and disposed immediately above the support arms 26 are guide brackets 28, each having a downwardly and inwardly inclined guide surface 29.

Referring to FIG. 6 of the drawings, the rack sections 12 and 13 are interconnected at the upper ends thereof by a plurality of laterally extending elongated head rails 30 (one shown), which project laterally outboard of the battery bays 25. Each head rail 30 has connected respectively to the opposite ends thereof and depending therefrom an elongated vertical support member 31, interconnected with the adjacent one of the post members 20 by horizontal laterally-extending cross members 32. It will be appreciated that the vertical supports 31 are preferably also interconnected by horizontal members (not shown) extending longitudinally of the rack sections 12 and 13. Disposed on the head rails 30 and covering the top of the system 10 is a deck 33 which may be formed of steel mesh or any other suitable material. The deck 33 may be arranged to cover only the rack sections 12 and 13, or it may also extend across the aisle 14, if desired.

The vertical supports 31 cooperate with the posts 20 and the cross members 32 for defining a plurality of charger locations or bays 35, each of which may also be provided with a floor 34 which may be steel mesh decking or the like. Preferably, the vertical supports 31 extend downwardly only alongside the upper two levels or the rack sections 12 and 13, as illustrated in FIG. 6, so that the lower two levels may be left open to provide direct access to the rear of the battery bays 25 at those levels.

Each of the charger bays 35 is adapted to support therein one or more associated chargers 16 or 16a. Since the charger bays 35 are provided only along the upper two levels of the rack sections 12 and 13, chargers 16 and 16a may also be stored on the deck 33 at the top of the system 10. Also, it will be appreciated that the system 10 is designed to handle different types of batteries with different voltages which, accordingly, require different types and sizes of charger. Some of these chargers 16a are small enough so that more than one can be accommodated in a single charger bay 35 (see FIG. 1). Thus, the system 10 provides storage space for chargers 16 and 16a equal in total number to the number of battery bays 25. Spanning the head rails 30 and extending longitudinally of the system 10 above the aisle are a plurality of electrical power bars 36 and communication bars 37.

Figure 8:
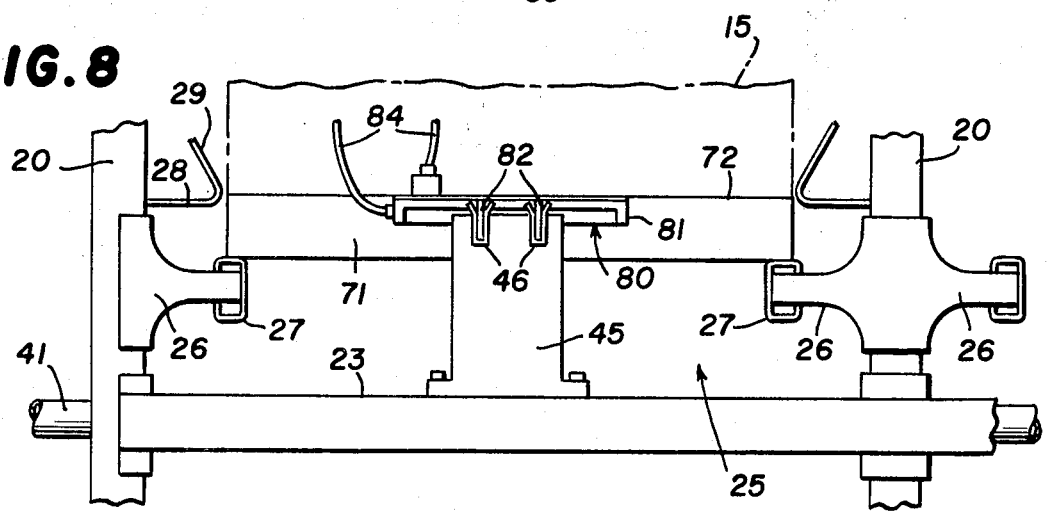
FIG. 8 is a fragmentary view, similar to FIG. 7, illustrating the electrical connectors engaged with the battery pallet disposed in its charging position on the rack.
Figure 7:
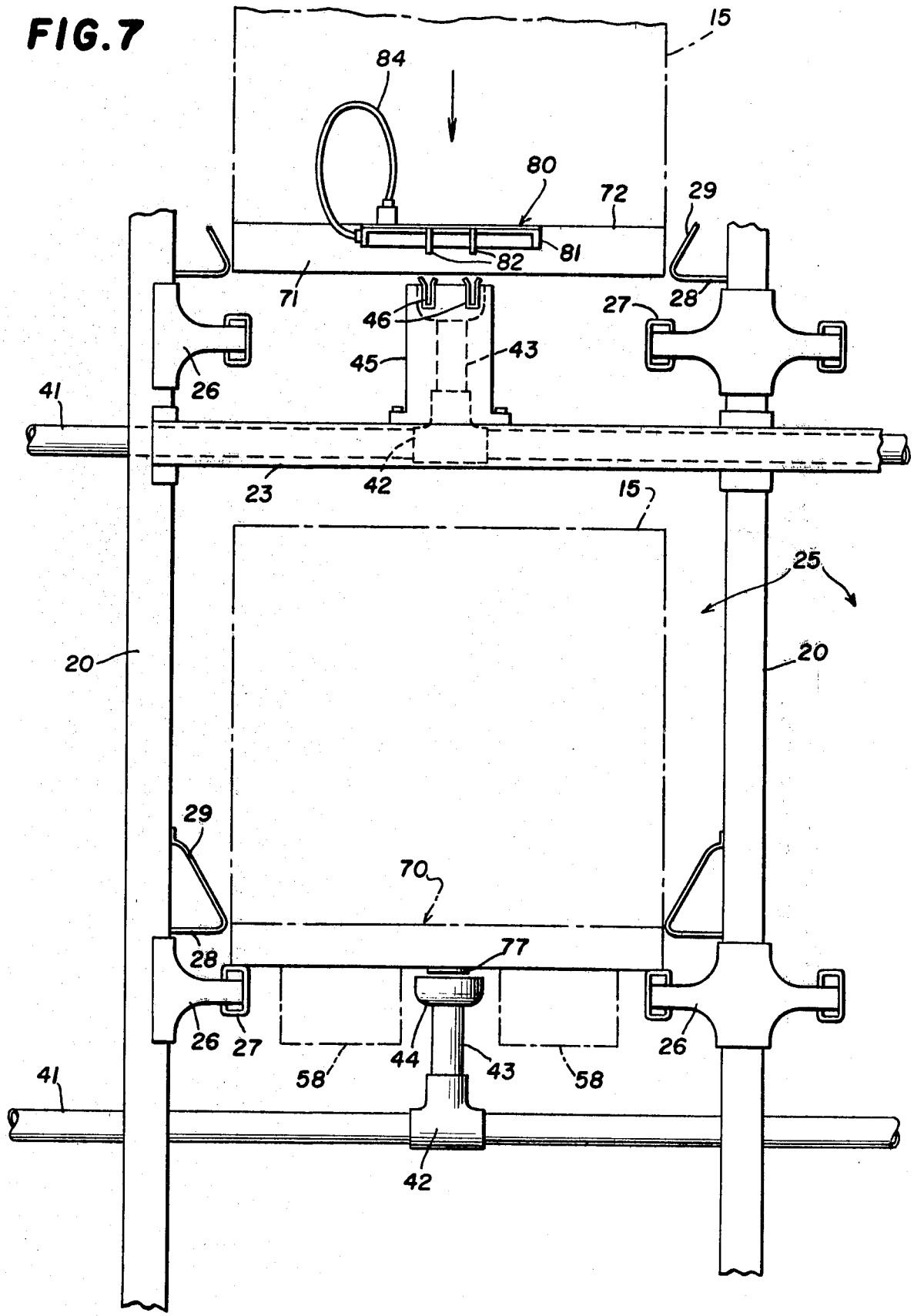
FIG. 7 is a further enlarged, fragmentary, side elevational view of the storage rack of the battery charging system, taken along the line 7—7 in FIG. 6.

Referring also to FIGS. 7 and 8, each of the rack sections 12 and 13 also includes a fluid collection system, generally designated by the numeral 40 (see FIG. 4), which includes a network of piping 41 including horizontal runs and vertical headers, and formed of corrosive-resistant material, such as PVC. At each of the battery bays 25, the piping 41 is provided with a tee connector 42 and a vertical inlet section 43 (see FIG. 7), the section 43 being provided at its upper end with an enlarged inlet cup 44 positioned just below the plane of the upper surfaces of the support rails 27. Also carried by the cross members 23 and respectively positioned at the battery bays 25 are a plurality of electrical connection blocks 45, each provided at the upper end thereof with a female receptacle comprising a pair of vertically recessed sockets 46. Each of the sockets 46 is connected by suitable electrical connectors (not shown) to a selected one of the battery chargers 16 or 16a.

Referring to FIG. 5, the system 10 also includes a transport vehicle 50 disposed in the aisle 14 for movement therealong between the rack sections 12 and 13. The transport vehicle 50 may be of the type disclosed in U.S. Pat. No. 3,593,823, and includes a trolley carriage 51 provided with wheels 52 adapted for rolling engagement with an underlying guide rail 53 mounted on the floor 21 and extending longitudinally of the aisle 14 centrally thereof. Mounted on the carriage 53 are electrically-powered drive motors and a pair of vertically-extending masts 54, on which are supported an elevator 55 adapted for vertical movement therealong. The masts 54 are provided at their upper ends with a guide mechanism adapted for guiding engagement with a guide track 56 supported by the head rails 30. The elevator 55 carries a pair of horizontally laterally movable forks 58, all in a well-known manner. Also carried on the carriage 51 is a control panel 59 for controlling the operation of the transport vehicle 50.

In use, it will be appreciated that the transport vehicle 50 moves horizontally longitudinally of the aisle 14, the elevator 50 moves vertically to reach any of the four levels of the rack assembly 11, and the forks 58 move laterally in either direction into and out of selected ones of the battery bays 25. The horizontal travel of the trolley 51 terminates at the left-hand end of the system 10, as viewed in FIG. 1, so that the forks 58 are disposed between a deposit station 60 and a pick-up station 61 respectively disposed on opposite sides of the aisle 14. A suitable platform is provided at the deposit station 60 and is connected by a live roller conveyor 62 to a load-/unload station 64, the conveyor 62 preferably passing through a washer/dryer 63. The load/unload station 64 is in turn connected by a suitable conveyor 68 to the pick-up station 61. Preferably there is provided an auxiliary hoist means, such as a bridge crane 66, for removing batteries from fork lift trucks 17 and placing them at a holding stand 67 adjacent to the load/unload station 64. A control station 69 may be provided for overall control of the system 10. In this regard, the system 10 may be computer-controlled for substantially automatic operation, as will be explained more fully below.

Referring in particular to FIGS. 2, 3, 7 and 8 of the drawings, a significant aspect of the present invention is the provision of a plurality of battery pallets, each generally designated by the numeral 70, the pallets 70 preferably being equal in number to the battery bays 25. Each of the pellets 70 includes a body 71 of unitary, one-piece construction which is preferably formed of molded fiberglass. The body 71 is generally rectangular in shape and has an upper flat planar support surface 72 provided with a plurality of rectangular recesses 73 therein. The floors 74 of the recesses 73 slope laterally inwardly to a central channel 75 extending longitudinally of the body 71, and they also slope downwardly from one end of the body 71 to the other, terminating at a drain 76 at the deep end. The drain 76 may be provided with a short spout 77 (see FIG. 7) at the lower end thereof.

Each pallet 70 is also provided with a connection block, generally designated by the numeral 80 adapted to be connected to the body 71 by suitable fasteners. While the connection block 80 is illustrated in the drawings as being connected to the pallet 70 at one end thereof, adjacent to the drain 76, it will be appreciated that it could be mounted at any position desired on the body 71. Indeed, there will preferably be provided alternative mounting locations on the pallet 70 for different types of batteries, as indicated in phantom line in FIG. 3. The connection block 80 includes a rectangular open-bottom guard 81 covering a pair of depending male connector blades 82 (see FIGS. 7 and 8), which are in turn electrically connected to one end of a cable 84 carried by the guard 81, the other end of the cable 84 being adapted for connection to a battery 15 which will be supported on the support surface 72 of the pallet 70.

The operation of the system 10 will now be described. It will be understood that all of the chargers 16 and 16a carried by the rack assembly 11 are electrically connected by suitable means (not shown) to the power bars 36, which are in turn connected to an associated source of electric power. Preferably, each pallet 70 is permanently assigned to a specific one of the battery bays 25. When disposed in its bay 25, the pallet 70 rests upon the support rails 27 (see FIGS. 7 and 8), with the drain spout 77 positioned immediately over the inlet cup 44 of the fluid collection system 40, and with the connector blades 82 disposed in electrical engagement with the sockets 46 of the connection block 45. In this regard, it will be appreciated that, for different types of batteries the connection block 80 on the pallet and the connection block 45 at the battery bay 25 may be disposed in different positions, but they will always be arranged for mating engagement with each other when the pallet 70 is disposed in its charging position, illustrated in FIG. 8. While the connection block 80 can be moved to different positions on the pallet 70, since the pallet 70 will normally be permanently assigned to a specific battery bay 25 for use with a specific type of battery, it will normally not be necessary to change the location of the connection block 80.

When it is desired to replace the battery of a fork lift truck 17, it is driven to the position illustrated in FIG. 1. The operator, who may be the forklift truck driver or other operating personnel, determines, by voltage, which type of replacement battery is necessary and enters this information into the system by way of a keyboard and cathode ray tube display at the system control station 69. He then removes the battery 15 from the truck 17, using the bridge crane 66, and deposits the battery 15 on the holding stand 67 or, alternatively, on a spare pallet 70 which may be disposed at the load/unload station 64.

The system control computer will determine which battery 15 of the desired type has been stored the longest in the system 10 and will then command the transport vehicle 50 to go to that storage bay 25 and retrieve the battery/pallet combination therefrom. In this regard, the forks 58 of the transport vehicle 50 will be inserted beneath the pallet 70 and between the support rails 27 (see FIG. 7), to lift the pallet/battery combination therefrom and pull it laterally back out of the bay 25 and onto the elevator 55, in a well known manner. The transport vehicle 50 will then carry the selected battery 15 on its pallet 70 to alongside the deposit station 60, and the forks 58 will then deposit the battery/pallet combination on the conveyor 62.

The conveyor 62 will carry the battery/pallet combination through the washer/dryer 63 to remove any spilled battery fluids or the like, and then will carry the washed battery/pallet combination around to the load/unload station 64. There, the operator will use the bridge crane 66 to remove the charged battery 15 from its pallet 70 and place it in the fork lift truck 17. The operator will then use the bridge crane to move the discharged battery from the holding stand 67 onto the just-vacated pallet 70. At this point the battery fluid levels and other desired checks will be completed.

After completion of the checks, the operator will connect the battery 15 to the pallet 70 by means of the cable 84, and will then release the discharged battery 15 on its pallet 70 from the load/unload station 64 and it will be moved by the conveyor 68 to the pick-up station 61, where the forks 58 of the transport vehicle will pick it up and the transport vehicle 50 will then return it to the same battery bay 25 from which the charged battery 15 was just removed. In this regard, when the battery/pallet combination is inserted in its bay 25, the forks 58 will be lowered between the support rails 27, the guide brackets 28 serving to guide and center the pallet 70 therebetween so as to position it accurately on the support rails 27.

A significant aspect of the present invention is the mating arrangement of the parts so that, as the pallet 70 is lowered into its charging position, the connector blades 82 automatically are inserted into the sockets 46 and the drain spout 77 is positioned correctly immediately over the inlet cup 44 of the fluid collection system 40. In like manner, it will be appreciated that when the pallet 70 is removed from the bay 25, the removal automatically disengages the connector blades 82 from the sockets 46. Once these parts are automatically connected, the associated charger 16 or 16a automatically begins to recharge the battery 15. Any excess fluids such as from boilover or the like are collected in the trough formed by the recesses 73 on the pallet 70 and flow to the drain 76 and into the fluid collection system 40.

It will be appreciated that the present invention minimizes any contact of the operator with fluids escaping from the batteries 15 and also obviates the operator coming into close proximity to the batteries 15 during the hazardous charging operation. The system 10 can be simply operated by one man, occupies a minimum of floor space and is adaptable for computer control for quick and accurate operation. Furthermore, the system assures first-in, first-out operation so that the operator can always be certain of retrieving the most fully-charged battery of the type desired.

What is claimed is:

1. A battery charging system for supporting and interconnecting industrial storage batteries and associated chargers, said system comprising: rack means defining a plurality of battery locations, battery support means at each of said battery locations for supporting only a single battery thereat in a charging position, charger support means for supporting a plurality of chargers equal in number to said battery locations, first connector means electrically connectable to each associated battery, and a plurality of second connector means respectively disposed at said battery locations and respectively electrically connected to associated chargers on said charger support means, said first and second connector means being arranged for electrical interconnection in response to movement of a battery to its charging position at a selected one of said battery locations and for electrical disconnection in response to movement of the battery from said charging position.

2. The battery charging system of claim 1, wherein said rack means includes guide means at each of said battery locations for guiding the associated battery to its charging position.

3. The battery charging system of claim 1, and further including fluid collection means carried by said rack means and including a plurality of fluid inlets respectively disposed at said battery locations for receiving fluid from associated batteries disposed in charging positions at said battery locations, and common conduit means communicating with all of said fluid inlets.

4. The battery charging system of claim 1, wherein said first connector means includes a male connector and each of said second connector means includes a female connector.

5. The battery charging system of claim 1, wherein said rack means includes elongated parallel spaced-apart rack sections, each of said rack sections having a plurality of vertically-arranged levels.

6. A battery charging system for supporting and interconnecting industrial storage batteries and associated chargers, said system comprising: rack means defining a plurality of battery locations and a plurality of charger locations, one or more pallets, each of said pallets being adapted for supporting an associated battery thereon, first connector means carried by each of said pallets and electrically connectable to a battery supported on said pallet, pallet support means at each of said battery locations for supporting a pallet thereat in a charging position, charger support means at each of said charger locations for supporting a charger thereat, and a plurality of second connector means respectively disposed at said battery locations and respectively electrically connected to associated chargers at said charger locations, said first and second connector means being arranged for electrical interconnection in response to movement of a pallet to its charging position at a selected one of said battery locations to charge the battery on said pallet and for electrical disconnection in response to movement of said pallet from said charging position.

7. The battery charging system of claim 6, wherein said first connector means includes a connection block mountable on said pallet, said connection block including coupling means electrically connectable to a battery supported on said pallet and a first connector electrically connected to said coupling means and disposed for interconnection with said second connector means.

8. The battery charging system of claim 7, wherein each of said pallets has plural mounting locations thereon for mounting said connection block.

9. The battery charging system of claim 7, wherein said first connector comprises a male connector, each of said second connector means including a female connector.

10. The battery charging system of claim 7, wherein said connection block includes a guard member for shielding said first connector.

11. The battery charging system of claim 6, wherein each of said pallets includes fluid receiving means for receiving fluid from a battery supported on said pallet.

12. The battery charging system of claim 11, wherein said fluid receiving means includes a fluid outlet, said rack means including fluid collection means having a plurality of fluid inlets respectively disposed at said battery locations for cooperation with the fluid outlet of said pallet when disposed in the charging position thereof in a selected one of said battery locations for collecting fluid from said fluid receiving means on said pallet.

13. The battery charging system of claim 6, wherein said rack means includes guide means at each of said battery locations for guiding said pallet to its charging position.

14. A battery charging system for supporting and interconnecting industrial storage batteries and associated chargers, said system comprising: rack means defining a plurality of battery locations and a plurality of charger locations; one or more pallets, each of said pallets including a body having a support surface for supporting an associated battery thereon, a plurality of recesses in said support surface communicating with one another to form a trough for receiving fluids from the associated battery, said trough having an outlet, and a connection block mountable on said body, said connection block including coupling means electrically connectable to a battery supported on said support surface and a first connector electrically connected to said coupling means; pallet support means at each of said battery locations for supporting a pallet thereat in a charging position; charger support means at each of said charger locations for supporting a charger thereat; fluid connection means on said rack having a plurality of fluid inlets respectively disposed at said battery locations for cooperation with the fluid outlet of said pallet when disposed in a charging position thereof in a selected one of said battery locations for collecting fluids from said fluid receiving means on said pallet; and a plurality of second connectors respectively disposed at said battery locations and respectively electrically connected to associated chargers at said charger locations, said first and second connectors being arranged for electrical interconnection in response to movement of a pallet to its charging position at a selected one of said battery locations to charge the battery on said pallet and for electrical disconnection in response to movement of said pallet from said charging position.

15. A battery charging system for supporting and interconnecting industrial storage batteries and associated chargers, said system comprising: rack means defining a plurality of battery locations, battery support means at each of said battery locations for supporting only a single battery thereat in a charging position, charger support means for supporting a plurality of chargers equal in number to said battery locations, first connector means electrically connectable to each associated battery, a plurality of second connector means respectively disposed at said battery locations and respectively electrically connected to associated chargers on said charger support means, and transport means for moving batteries with said first connector means connected thereto to and from charging positions at selected ones of said battery locations, said first and second connector means being arranged for electrical interconnection in response to movement of a battery to its charging position at a selected one of said battery locations and for electrical disconnection in response to movement of the battery from said charging position.

16. The battery charging system of claim 15, wherein said transport means includes a load carrier movable among said battery locations.

17. The battery charging system of claim 16, wherein said load carrier is movable among a battery pick up station and a battery deposit station and said battery locations in said rack means, said transport means further including first conveyor means extending from said battery deposit station to a loading and unloading station and second conveyor means extending from said loading and unloading station to said battery pick-up station.

18. The battery charging system of claim 17, wherein said transport means further includes hoist means for moving discharged batteries to said loading and unloading station and for moving charged batteries from said loading and unloading station.

19. The battery charging system of claim 15, wherein said rack means includes elongated parallel spaced-apart rack sections, each of said rack sections having a plurality of vertically arranged levels.

20. The battery charging system of claim 19, wherein said transport means includes a load carrier movable horizontally longitudinally, vertically and horizontally laterally with respect to said rack sections.

21. A battery charging system for supporting and interconnecting industrial storage batteries and associated chargers, said system comprising: rack means defining a plurality of battery locations and a plurality of charger locations, one or more pallets, each of said pallets being adapted for supporting an associated battery thereon, first connector means carried by each of said pallets and electrically connectable to a battery supported on said pallet, pallet support means at each of said battery locations for supporting a pallet thereat in a charging position, charger support means at each of said charger locations for supporting a charger thereat, a plurality of second connector means respectively disposed at said battery locations and respectively electrically connected to associated chargers at said charger locations, and transport means engageable with said pallets for moving said pallets and the batteries thereon with said first connector means connecting thereto to and from charging positions at selected ones of said battery locations, said first and second connector means being arranged for electrical interconnection in response of a pallet to its charging position at a selected one of said battery locations to charge the battery on said pallet and for electrical disconnection in response to movement of said pallet from said charging position.

22. The battery charging system of claim 21, wherein said transport means includes load-support arms engageable with the underside of said pallet for supporting same, said arms being movable horizontally and vertically.

23. The battery charging system of claim 21, wherein said transport means includes a load carrier, each of said pallet support means includes a pair of spaced-apart support members respectively engageable with said pallet adjacent to the lateral side edges thereof, the spacing between said support members being sufficient to accommodate movement of said load carrier therebetween.

24. The battery charging system of claim 21, and further including control means connected to said transport means for controlling the movement thereof.

25. A battery pallet for use in a battery charging system comprising: a body having a support surface for supporting an associated battery thereon, a plurality of recesses in said support surface communicating with one another to form a trough for receiving fluids from the associated battery, and electrical connection means carried by said body and adapted to be electrically connected to a battery disposed on said support surface.

26. The battery pallet of claim 25, wherein said electrical connection means includes a connection block mountable on said body, said connection block including coupling means electrically connectable to a battery disposed on said support surface and a connector adapted to be electrically connected to an associated battery charger.

27. The battery pallet of claim 26, wherein said body has a plurality of mounting locations thereon for mounting said connection block.

28. The battery pallet of claim 26, wherein said connector comprises a male connector.

29. The battery pallet of claim 26, wherein said connection block includes a guard member for shielding said connector.

30. The battery pallet of claim 25, wherein said trough includes a fluid outlet.

31. The battery pallet of claim 25, wherein said body is of unitary one-piece construction.

32. The battery pallet of claim 31, wherein said body is formed of molded fiberglass.

33. A battery pallet for use in a battery charging system comprising: a body having a support surface for supporting an associated battery thereon, and a connection block mountable on said body, said connection block including coupling means electrically connectable to a battery disposed on said support surface and a connector electrically connected to said coupling means and adapted to be electrically connected to an associated battery charger.

34. The battery pallet of claim 33, wherein said body has a plurality of mounting locations thereon for mounting said connection block.

35. The battery pallet of claim 33, wherein said connector comprises a male connector.

36. The battery pallet of claim 33, wherein said connection block includes a guard member for shielding said connector.

* * * * *